United States Patent
Gierke

(10) Patent No.: US 11,420,661 B2
(45) Date of Patent: Aug. 23, 2022

(54) MEASUREMENT SYSTEM AND METHOD FOR PRODUCING AN OUTPUT MEASUREMENT SIGNAL COMPRISING AT LEAST ONE ACCELERATION SENSOR

(71) Applicant: SIEMENS MOBILITY GMBH, Munich (DE)

(72) Inventor: Hartmut Gierke, Salzgitter (DE)

(73) Assignee: Siemens Mobility GmbH, Munich (DE)

(*) Notice: Subject to any disclaimer, the term of this patent is extended or adjusted under 35 U.S.C. 154(b) by 380 days.

(21) Appl. No.: 16/499,428

(22) PCT Filed: Mar. 13, 2018

(86) PCT No.: PCT/EP2018/056150
§ 371 (c)(1),
(2) Date: Sep. 30, 2019

(87) PCT Pub. No.: WO2018/177736
PCT Pub. Date: Oct. 4, 2018

(65) Prior Publication Data
US 2020/0039545 A1  Feb. 6, 2020

(30) Foreign Application Priority Data
Mar. 29, 2017  (DE) .................... 10 2017 205 312.7

(51) Int. Cl.
*B60L 3/10* (2006.01)
*B61L 25/02* (2006.01)
(Continued)

(52) U.S. Cl.
CPC .............. *B61L 25/021* (2013.01); *B60L 3/10* (2013.01); *B60L 3/12* (2013.01); *G01P 15/001* (2013.01);
(Continued)

(58) Field of Classification Search
CPC .... B61L 25/021; B61L 25/026; G01P 15/001; G01P 15/00; G01P 21/00; B60L 3/12; B60L 2240/14; B60L 3/10; B60T 8/172
(Continued)

(56) References Cited

U.S. PATENT DOCUMENTS 8,751,190 B2  6/2014  Geisler et al.
9,989,554 B2  6/2018  Grundmann
(Continued)

FOREIGN PATENT DOCUMENTS

CN  1042992 A  6/1990
CN  1738738 A  2/2006
(Continued)

*Primary Examiner* — Zachary L Kuhfuss
(74) *Attorney, Agent, or Firm* — Laurence A. Greenberg; Werner H. Stemer; Ralph E. Locher

(57) ABSTRACT

A measurement system for a vehicle includes an acceleration sensor. A first acceleration sensor of a sensor pair is fastened to a vehicle wheel and a second acceleration sensor of the sensor pair is fastened to the same vehicle wheel diametrically opposite with respect to the wheel axle. An evaluation device is connected to the two acceleration sensors of the sensor pair and generates an output measurement signal using the sensor signals from the two acceleration sensors.

15 Claims, 3 Drawing Sheets

(51) Int. Cl.
*B60L 3/12* (2006.01)
*G01P 15/00* (2006.01)

(52) U.S. Cl.
CPC ......... *B60L 2240/14* (2013.01); *B61L 25/026* (2013.01)

(58) Field of Classification Search
USPC .......................................................... 701/80
See application file for complete search history.

(56) References Cited

U.S. PATENT DOCUMENTS

| | | | | |
|---|---|---|---|---|
| 10,131,369 | B2* | 11/2018 | Fischer | G01M 17/08 |
| 11,193,814 | B2* | 12/2021 | Salzgeber | G01G 19/08 |
| 2006/0144182 | A1* | 7/2006 | Taniguchi | G01P 15/0888 74/479.01 |
| 2010/0010770 | A1* | 1/2010 | Helck | G01P 15/00 702/141 |
| 2011/0066397 | A1 | 3/2011 | Kranz | |
| 2012/0116607 | A1* | 5/2012 | Guinart | B60C 23/0416 701/1 |
| 2020/0039545 | A1* | 2/2020 | Gierke | B61L 25/021 |
| 2021/0261403 | A1* | 8/2021 | Gattere | G01C 9/00 |

FOREIGN PATENT DOCUMENTS

| | | |
|---|---|---|
| CN | 1781660 A | 6/2006 |
| CN | 101432155 A | 5/2009 |
| CN | 101598569 A | 12/2009 |
| CN | 102472635 A | 5/2012 |
| CN | 103185563 A | 7/2013 |
| CN | 104718121 A | 6/2015 |
| DE | 102004037593 A1 | 5/2006 |
| DE | 102009045305 A1 | 4/2011 |
| DE | 102013217478 A1 | 3/2015 |
| EP | 2660121 A1 | 11/2013 |
| JP | H1164360 A | 3/1999 |
| JP | 2005265561 A | 9/2005 |
| JP | 2009236821 A | 10/2009 |
| WO | WO 2012096662 A1 | 7/2012 |
| WO | 2013098225 A1 | 7/2013 |

* cited by examiner

MEASUREMENT SYSTEM AND METHOD FOR PRODUCING AN OUTPUT MEASUREMENT SIGNAL COMPRISING AT LEAST ONE ACCELERATION SENSOR

BACKGROUND OF THE INVENTION

Field of the Invention

The invention relates to a measurement arrangement for a vehicle comprising at least one acceleration sensor. As is known, vehicles, in particular rail vehicles, can be equipped with acceleration sensors to detect vehicle acceleration.

SUMMARY OF THE INVENTION

The invention is based on the object of specifying an improved measurement arrangement.

This object is achieved according to the invention by a measurement arrangement with the features as claimed in claim 1. Advantageous embodiments of the measurement arrangement according to the invention are specified in dependent clams.

Thereafter, it is provided according to the invention that a first acceleration sensor of a sensor pair is fastened to a vehicle wheel and a second acceleration sensor of the sensor pair is fastened to the same vehicle wheel diametrically opposite with respect to the wheel axle, and an evaluation device is connected to the two acceleration sensors of the sensor pair and generates an output measurement signal using the sensor signals from the two acceleration sensors.

A significant advantage of the measurement arrangement according to the invention is that an influence of gravitational force that falsifies the measurement—for example, in the case of an incline—can be eliminated or deducted from the signal evaluation because the acceleration sensors are diametrically opposite one another.

According to the invention, the measurement arrangement also has an angle sensor which measures the angle of rotation of the vehicle wheel with the formation of an angle of rotation value.

The evaluation device is connected to the angle sensor according to the invention and determines the output measurement signal using the angle of rotation value and the sensor signals from the acceleration sensors of the sensor pair.

The distance of the acceleration sensor from the wheel axis is preferably the same size.

With regard to a simple signal evaluation, it is considered advantageous if the two acceleration sensors of the sensor pair are connected in an analog or digital bridge circuit which generates a differential signal of the sensor signals formed with the correct sign as a bridge signal. The evaluation device preferably generates the output measurement signal using the bridge signal.

It is particularly advantageous if the two acceleration sensors of the sensor pair each have a first sensor element for generating a tangential sensor signal which specifies the respective tangential wheel acceleration, and a second sensor element for generating a radial sensor signal which specifies the respective wheel acceleration aligned in the direction of the center of the wheel, and the evaluation device generates the output measurement signal using the tangential and radial sensor signals of the sensor pair.

The alignment of the first sensor elements of the two acceleration sensors of the sensor pair is preferably identical in the case of an identical rotational position relative to the vehicle wheel.

It is also advantageous if the two acceleration sensors of the sensor pair are connected in a first bridge circuit which generates a differential signal of the tangential sensor signals formed with the correct sign as a first bridge signal, the two acceleration sensors of the sensor pair are connected in a second bridge circuit which generates a differential signal of the radial sensor signals formed with the correct sign as a second bridge signal, and the evaluation device generates the output measurement signal using the bridge signals.

The evaluation device preferably determines an acceleration value in the longitudinal direction of the vehicle as an output measurement signal.

Alternatively, or in addition, it can be provided that the evaluation device determines an incline value relative to the horizontal as an output measurement signal.

Alternatively, or in addition, it can also be provided that the evaluation device determines a slip change value and/or a slip value of the vehicle wheel as an output measurement signal.

It is particularly advantageous if, in addition to the sensor pair, the measurement arrangement has one or more further sensor pairs which each have a first acceleration sensor fastened to the same vehicle wheel and a second acceleration sensor fastened to the same vehicle wheel and diametrically opposite with respect to the wheel axle, and the evaluation device is also connected to the acceleration sensors of the additional sensor pair or sensor pairs and generates the output measurement signal using the sensor signals of all the sensor pairs.

The sensor pairs are preferably arranged in a rotationally symmetrical manner.

In the case of a plurality of sensor pairs, it is also advantageous if the two acceleration sensors of each sensor pair are each connected in at least one associated bridge circuit which generates a differential signal of the sensor signals formed with the correct sign as a bridge signal or bridge signals respectively and the evaluation device determines the output measurement signal using the bridge signals of the sensor pairs.

The invention also relates to a vehicle, in particular a rail vehicle, which is equipped with a measurement arrangement, as described above.

Furthermore, the invention relates to a method for producing an output measurement signal comprising a measurement arrangement which has at least one acceleration sensor. According to the invention, it is provided with respect to such a method that a first acceleration sensor of a sensor pair is fastened to a vehicle wheel and a second acceleration sensor of the sensor pair is fastened to the same vehicle wheel diametrically opposite with respect to the wheel axle and the output measurement signal is generated using the two acceleration sensors of the sensor pair.

With regard to the advantages of the method according to the invention, reference is made to the above embodiments in connection with the measurement arrangement according to the invention.

BRIEF DESCRIPTION OF THE SEVERAL VIEWS OF THE DRAWING

The invention is explained in more detail hereinafter with reference to the exemplary embodiments. In the drawings, by way of example.

DESCRIPTION OF THE INVENTION

Figure 1:
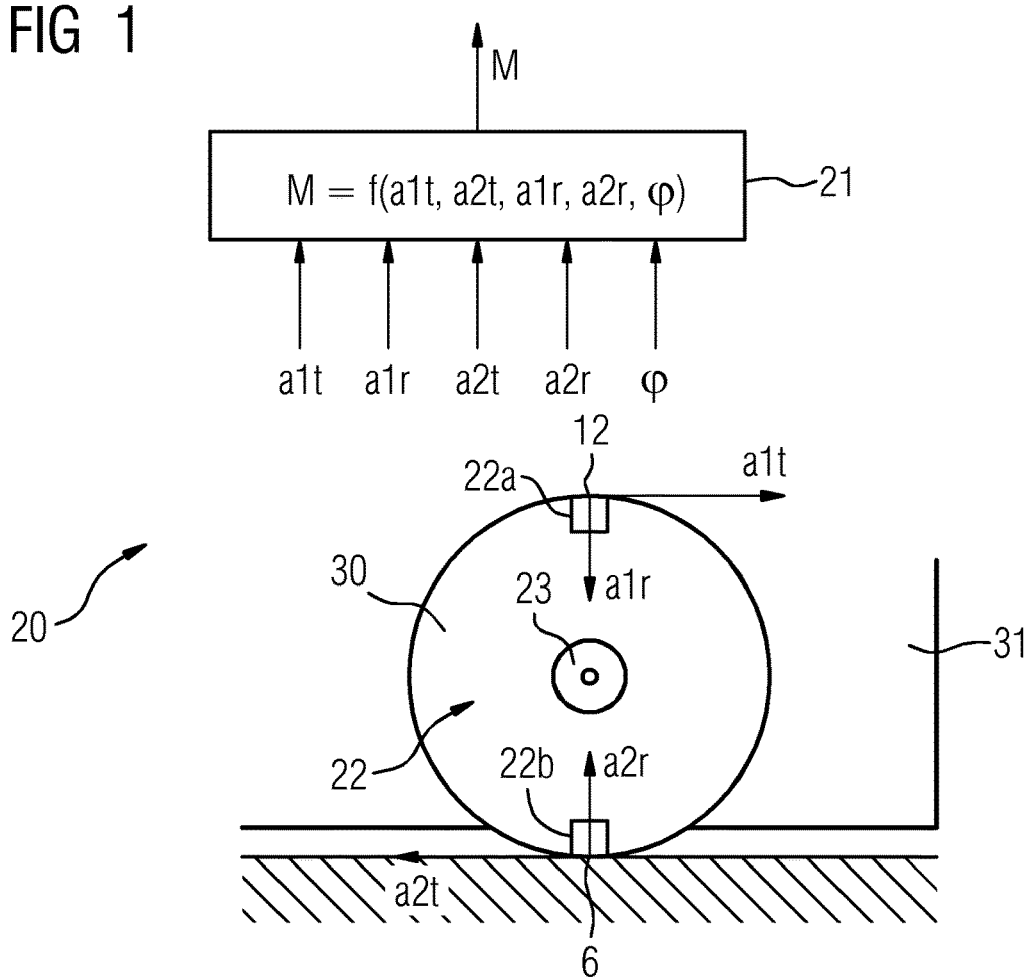
FIG. 1-4 show a first exemplary embodiment for a measurement arrangement according to the invention, with regard to which, by way of example, a plurality of variants for the method according to the invention or a plurality of variants for possible operating methods of the measurement arrangement are described.

In the figures, the same reference characters are always used for comparable or identical components for reasons of clarity.

FIG. 1 shows a measurement arrangement 20 comprising an evaluation device 21, a sensor pair 22 which is connected to the evaluation device 21 and an angle measuring device or angle sensor 23. The connection between the sensor pair 22 and the angle measuring device 23 with the evaluation device 21 is not shown further in FIG. 1 for reasons of clarity, the connection may be designed to be wired or wireless (for example, via infrared or radio).

The sensor pair 22 is fastened to a vehicle wheel 30 of a vehicle 31 not shown in more detail and has a first acceleration sensor 22a and a second acceleration sensor 22b fastened to the same vehicle wheel 30 diametrically opposite with regard to the vehicle axle.

Figure 2:
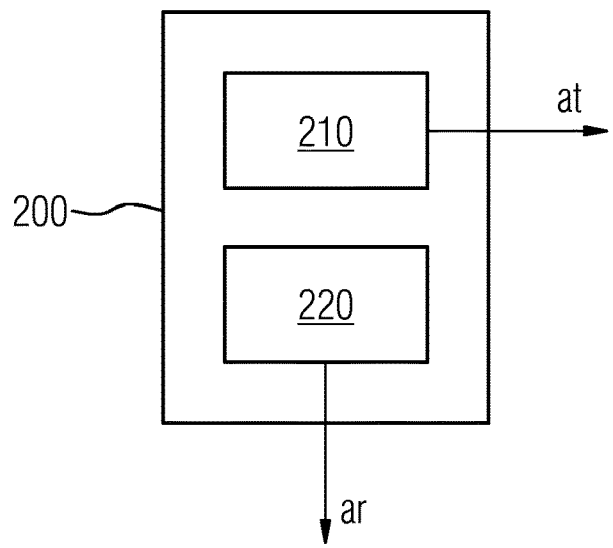

The two acceleration sensors 22a and 22b are preferably identical in construction. FIG. 2 shows in more detail an exemplary embodiment of an acceleration sensor which can be used as each of the two acceleration sensors 22a and 22b in the measurement arrangement 20 according to FIG. 1; the sensor is characterized by the reference character 200.

The acceleration sensor 200 comprises a first sensor element 210 for generating a sensor signal at, which, in the case of the assembly on the vehicle wheel 30 shown in FIG. 1, indicates the respective tangential wheel acceleration, and a second sensor element 220 for generating a radial sensor signal ar, which indicates the respective wheel acceleration aligned in the direction of the wheel.

In the presentation according to FIG. 1, the tangential sensor signals from the two acceleration sensors are characterized by the reference characters a1t or a2t and the radial sensor signals by the reference characters a1r and a2r, wherein the number "1" or "2" in the middle indicates whether the respective sensor signal originates from the first acceleration sensor 22a or the second acceleration sensor 22b.

The angle measuring device 23 indicates the respective angle of rotation φ (shown, for example, in FIG. 3) of the vehicle wheel 30.

In the exemplary embodiments shown in the figures, it is assumed by way of example that with an angle of rotation φ of zero degrees (see FIG. 1), the first acceleration sensor 22a is at the "12 o'clock" position, characterized by the reference character 12 in FIG. 1, and the second acceleration sensor 22b at the "6 o'clock" position, characterized by the reference character 6 in FIG. 1. This assignment is arbitrary and to be understood only by way of example; in the case of another angle of rotation assignment, the evaluation can be adjusted mathematically in the evaluation device 21.

Figure 3:
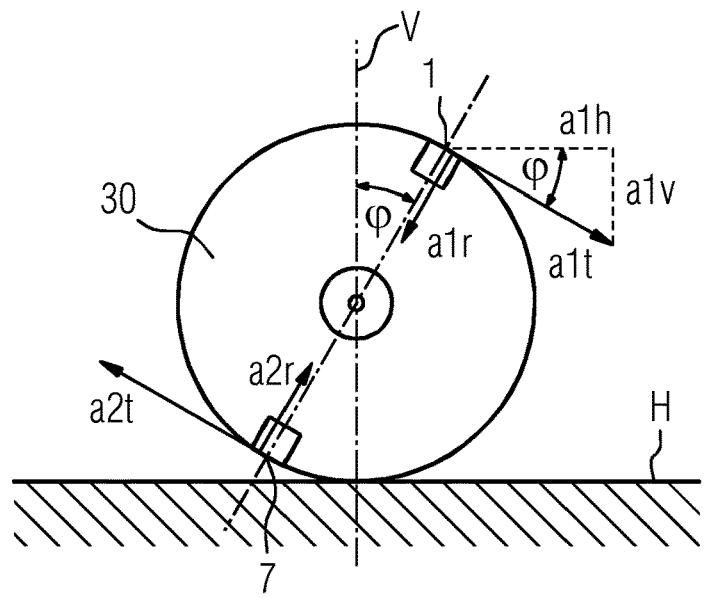

FIG. 3 shows the vehicle wheel 30 and the two acceleration sensors 22a and 22b after the vehicle wheel 30 has rotated further clockwise by an angle of rotation φ of approx. 30 degrees. The first acceleration sensor 22a is now at the "1 o'clock" position, characterized by the reference character 1 in FIG. 3, and the second acceleration sensor 22b is at the "7 o'clock" position, characterized by the reference character 7 in FIG. 3. It can be seen that the amounts of the tangential and radial sensor signals change relative to the horizontal H and vertical V by the wheel rotation.

The evaluation device 22 evaluates the tangential sensor signals a1t or a2t present on the input side and the radial sensor signals a1r and a2r of the two acceleration sensors 22a and 22b and the angle of rotation φ transmitted by the angle measuring device 23 by means of an angle of rotation signal and generates an output measurement signal M on the output side as a function f of these signals:

$$M = f(a1t, a2t, a1r, a2r, \alpha)$$

Depending on the embodiment of the evaluation device 21, the output measurement signal M may be an analog signal or a digital signal, for example, a binary signal. In the case of a binary signal M, a logic "one" of the signal may indicate, for example, that a predetermined state (for example, vehicle is accelerated) was detected, and a logic "zero" that the predetermined state was not detected. Of course, the assignment of logic "one" and "zero" may also be reversed.

The two acceleration sensors 22a and 22b of the sensor pair 22 are preferably connected in a first analog or digital bridge circuit which generates a differential signal Dt formed with the correct sign of the tangential sensor signals as a first bridge signal, according to:

$$Dt = a1t - a2t$$

In the case of a digital bridge circuit, the first bridge circuit may, for example, be formed by a differential differentiator.

The two acceleration sensors 22a and 22b of the sensor pair 22 are preferably also connected in a second bridge circuit which generates a differential signal Dr of the radial sensor signals formed with the correct sign as a second bridge signal, according to:

$$Dr = a1r - a2r$$

In the case of a digital bridge circuit the second bridge circuit may, for example, be formed by a differentiator.

Hereinafter, the output measurement signals M which the evaluation device 22 can generate depending on their embodiment is explained in more detail with reference to examples; the following embodiments are to be understood only by way of example and do not constitute a conclusive list of all the possible output measurement signals which the evaluation device 22 could form with the input signals:

1. Detection of a Standstill of the Vehicle:

In a first possible embodiment of the evaluation device 21, this generates a logic "one" as the output measurement signal M if the signals present on the input side indicate a standstill of the vehicle. Preferably, the evaluation device 21 generates the logic "one" when the angle φ does not change and the differential signals Dt and Dr are equal to zero or at least less than a predetermined lower threshold value Dmin, when the following therefore applies $$\omega = d\varphi/dt = 0 = \text{or at least } |d\varphi/dt| < \omega \text{ min}$$

and $$|Dt| < D \text{ min}$$

and $$|Dr| < D \text{ min}$$

wherein ω min indicates a predetermined lower threshold value for the rotation of the vehicle wheel 30.

In the event that the above conditions are met, theoretically there could be a uniform translational movement of the vehicle 31 with the vehicle wheel 30 blocked, if, for example, the vehicle 31 is towed away when the vehicle wheel 30 is blocked, although this constellation is unlikely. Should this nevertheless be taken into account, the output measurement signal M at a logic "one" would indicate that the vehicle wheel 30 is not rotating and the vehicle 31 is performing an unaccelerated movement.

Figure 4:
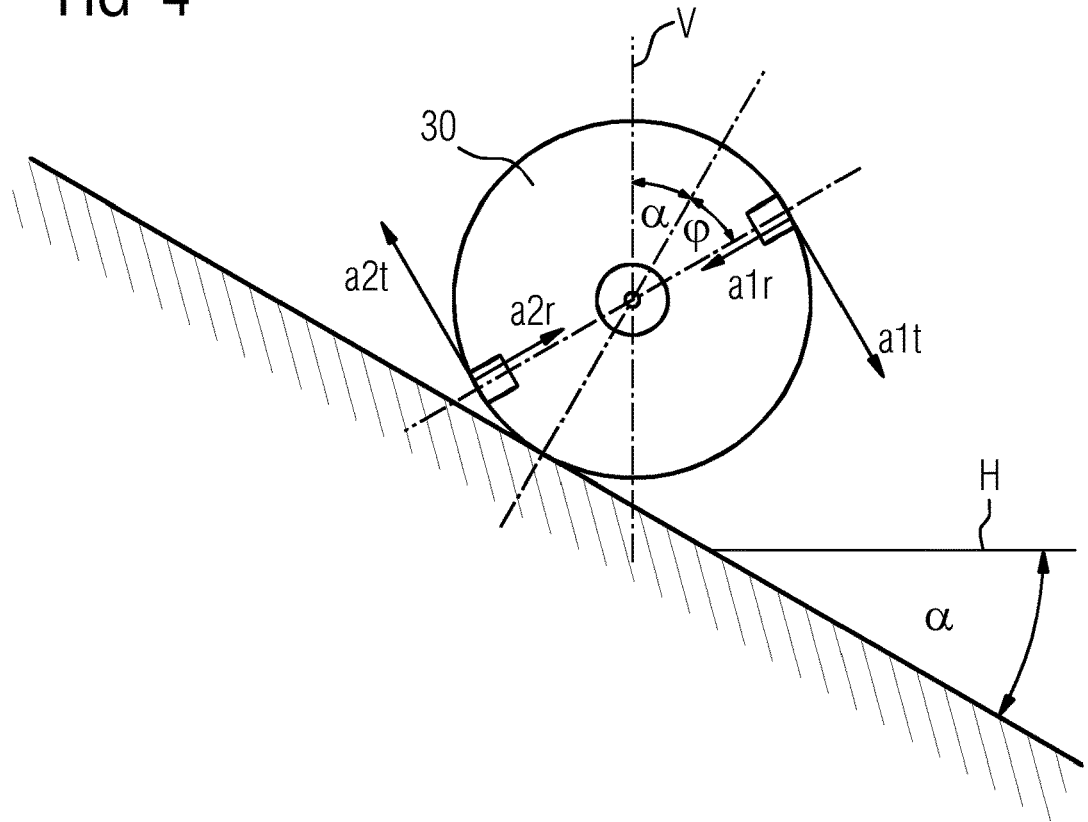

2. Detection of a Vehicle Incline when the Vehicle is Inclined:

In FIG. 4 it can be seen that the vehicle standstill detection under point 1 above also works in the case of an incline α, because due to the pairwise differentiation of the sensor signals, the conditions $$\omega = d\varphi/dt = \text{or at least } |d\varphi/dt| < \omega \text{ min}$$

and $$|Dt| < D \text{ min}$$

and $$|Dr| < D \text{ min}$$

are fulfilled regardless of the incline α.

Apart from the standstill of the vehicle, the incline α can be calculated due to the opposing position of the acceleration sensors 22a and 22b because the angle of rotation φ is known.

In the case of a horizontal section, that is to say, an incline α=0, the following applies as shown in FIG. 3, for example:

$$a1v/a1h = \tan(\varphi) \text{ or}$$

$$\varphi = \arctan(a1v/a1h)$$

In general, that is to say in the case of any desired incline α, the following applies (see illustration in FIG. 4):

$$\alpha = \arctan(a1v/a1h) - \varphi$$

The same applies to the second acceleration sensor 22b:

$$\alpha = \arctan(a2v/a2h) - \varphi$$

A determination of the respective incline α is thus possible with the sensor signals; this also applies when the vehicle 31 is travelling.

3. Detection of a Vehicle Acceleration or an Acceleration of the Vehicle Axle:

With regard to FIGS. 1, 3 and 4, it can be seen that the evaluation device 20 can also determine the acceleration in the horizontal and vertical direction on the basis of the tangential and radial sensor signals (see reference characters a1*h* and a1*v* in FIG. 3), namely both on the basis of the respective tangential sensor signals as well as on the basis of the radial sensor signals. This is illustrated by way of example with reference to FIG. 3 and the tangential sensor signals:

$$a1h = a1t*\cos(\varphi)$$

$$a2h = a2t*\cos(\varphi)$$

wherein a1*h* indicates the horizontal acceleration of the respective acceleration sensor.

The acceleration Dh of the vehicle 31 in the horizontal direction can thus be determined according to:

$$Dh = a1h - a2h = (a1t - a2t)*\cos(\varphi)$$

For the radial sensor signals, the relationships apply accordingly:

$$Dh = a1h - a2h = (a1r - a2r)*\sin(\varphi)$$

It is likewise possible to eliminate sensor-specific measurement errors in the course of a wheel revolution by means of this method as these always act equally in opposite directions on the opposite position in the case of a wheel rotation.

4. Detection of a Slip of the Vehicle Wheel 30:

In a slip-free case, the acceleration Dh of the vehicle 31 in the horizontal direction corresponds to the change in the rotation speed w of the vehicle wheel 30. However, if it established that the following applies:

$$Dh \neq \pi*D \text{ rad}*d\omega/dt$$

wherein D rad indicates the wheel diameter, or that the deviation between the two sides of the equation exceeds a predetermined threshold value, then the evaluation device 20 can generate an output measurement signal M which indicates the presence of a change in the slip state of the wheel.

Alternatively, or in addition, the evaluation device 20 can generate an output measurement signal M which quantitatively indicates a change in the slip state, for example, according to:

$$\Delta SS = |(Dh - \pi*D \text{ rad}*d\omega/dt)/(\pi*D \text{ rad}*d\omega)/dt)|$$

wherein ΔSS is a quantitative slip change measurement variable.

5. Quantification of a Slip of the Vehicle Wheel 30:

A quantitative slip size SS can be determined using the quantitative slip change measurement variable ΔSS through integration over the time t.

Figure 5:
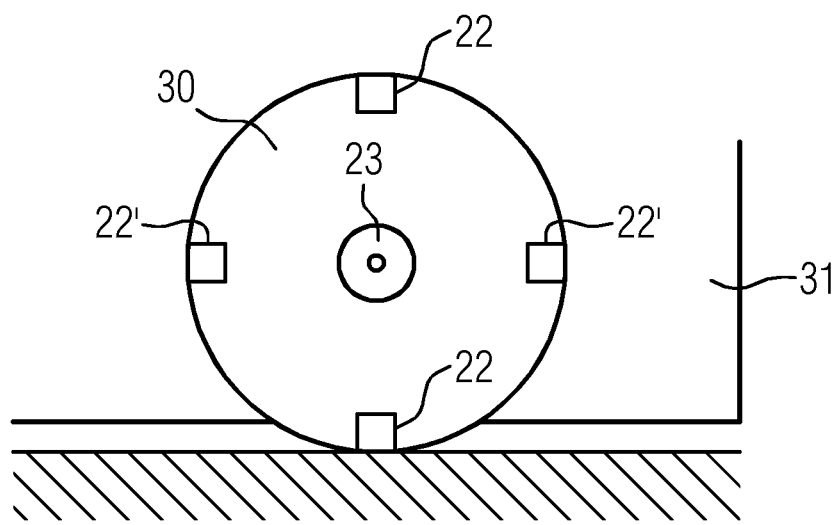
FIG. 5 shows a second exemplary embodiment for a measurement arrangement according to the invention.

FIG. 5 shows by way of example that the vehicle wheel 30 can be equipped with more than one sensor pair 22, for example, with a further sensor pair 22', as shown in FIG. 5. The sensor pairs are preferably arranged in a rotationally symmetrical manner.

The more sensor pairs are connected to the evaluation device 21 or the more sensor signals are available, the more accurately and reliably the output measurement signal M can be determined because the influence of measurement errors in individual measurement signals can be reduced, for example, by averaging.

Although the invention has been illustrated and described in more detail by preferred exemplary embodiments, the invention is not limited by the disclosed examples and other variations may be derived therefrom by a person skilled in the art without departing from the scope of the invention.

The invention claimed is:

1. A measurement arrangement for a vehicle, the measurement arrangement comprising:
   an acceleration sensor pair including a first acceleration sensor fastened to a vehicle wheel and a second acceleration sensor fastened to the vehicle wheel diametrically opposite from said first acceleration sensor with respect to a wheel axis;
   an angle sensor disposed to measure an angle of rotation of the vehicle wheel to form an angle of rotation value; and
   an evaluation device connected to said angle sensor for receiving from said angle sensor the angle of rotation value, and connected to said first and second acceleration sensors of said sensor pair for receiving sensor signals from said first and second acceleration sensors;

said evaluation device being configured to determine and outputting an output measurement signal using the angle of rotation value and the sensor signals from said first and second acceleration sensors of said sensor pair; and said evaluation device being configured to determine a slip change value and/or a slip value of the vehicle wheel as the output measurement signal.

2. The measurement arrangement according to claim 1, wherein said first and second acceleration sensors are equidistant from the wheel axis.

3. The measurement arrangement according to claim 1, wherein:
said first and second acceleration sensors of said sensor pair are connected in an analog or digital bridge circuit that generates a differential signal from sensor signals with a correct sign as a bridge signal; and
said evaluation device is configured to generate the output measurement signal using the bridge signal.

4. The measurement arrangement according to claim 1, wherein:
said each of said first and second acceleration sensors of said sensor pair has a first sensor element for generating a tangential sensor signal that indicates a respective tangential wheel acceleration, and a second sensor element for generating a radial sensor signal that indicates a respective wheel acceleration in the direction of a wheel center; and
said evaluation device is configured to generate the output measurement signal using the tangential sensor signals and the radial sensor signals of said sensor pair.

5. The measurement arrangement according to claim 4, wherein an alignment of said first sensor elements of said first and second acceleration sensors of said sensor pair is identical in case of an identical rotational position relative to the vehicle wheel.

6. The measurement arrangement according to claim 4, wherein:
said first and second acceleration sensors are connected in a first bridge circuit that generates a differential signal of the tangential sensor signals formed with a correct sign as a first bridge signal;
said first and second acceleration sensors are connected in a second bridge circuit that generates a differential signal of the radial sensor signals formed with a correct sign as a second bridge signal, and
said evaluation device is configured to generate the output measurement signal using the first and second bridge signals.

7. The measurement arrangement according to claim 1, wherein said evaluation device is configured to determine an acceleration value in the longitudinal direction of the vehicle as the output measurement signal.

8. The measurement arrangement according to claim 1, wherein said evaluation device is configured to determine an incline value relative to a horizontal as the output measurement signal.

9. The measurement arrangement according to claim 1, wherein:
said sensor pair is one of a plurality of sensor pairs including said sensor pair and one or more additional sensor pairs and each having a first acceleration sensor fastened to the same vehicle wheel and a second acceleration sensor diametrically opposite with respect to the wheel axis and fastened to the same vehicle wheel; and said evaluation device is also connected to said first and second acceleration sensors of said additional sensor pair or said additional sensor pairs and is configured to generate the output measurement signal of all of said sensor pairs using the sensor signals.

10. The measurement arrangement according to claim 9, wherein said sensor pairs are arranged in a rotationally symmetrical manner.

11. The measurement arrangement according to claim 9, wherein:
said first and second acceleration sensors of each sensor pair are in each case connected in at least one associated bridge circuit which in each case generates a differential signal formed with the correct sign of the sensor signals of the respective sensor pair as a bridge signal or bridge signals; and
said evaluation device is configured to determine the output measurement signal using the bridge signals of said sensor pairs.

12. A vehicle, comprising a measurement arrangement according to claim 1.

13. The vehicle according to claim 12, being a rail vehicle.

14. A method for producing an output measurement signal with a measurement arrangement having an acceleration sensor, the method comprising:
providing a sensor pair with a first acceleration sensor fastened to a vehicle wheel and a second acceleration sensor fastened to the same vehicle wheel diametrically opposite with respect to a wheel axle;
measuring an angle of rotation of the vehicle wheel with an angle sensor to form an angle of rotation value; and
generating and outputting the output measurement signal from signals received from the acceleration sensors of the sensor pair and the angle sensor; and
determining with an evaluation device a slip change value and/or a slip value of the vehicle as the output measurement signal.

15. A measurement arrangement for a vehicle, the measurement arrangement comprising:
an acceleration sensor pair including a first acceleration sensor fastened to a vehicle wheel and a second acceleration sensor fastened to the vehicle wheel diametrically opposite from said first acceleration sensor with respect to a wheel axis;
an angle sensor disposed to measure an angle of rotation of the vehicle wheel to form an angle of rotation value; and
an evaluation device connected to said angle sensor for receiving from said angle sensor the angle of rotation value, and connected to said first and second acceleration sensors of said sensor pair for receiving sensor signals from said first and second acceleration sensors;
said evaluation device being configured to determine and outputting an output measurement signal using the angle of rotation value and the sensor signals from said first and second acceleration sensors of said sensor pair;
said sensor pair being one of a plurality of sensor pairs including said sensor pair and one or more additional sensor pairs and each having a first acceleration sensor fastened to the same vehicle wheel and a second acceleration sensor diametrically opposite with respect to the wheel axis and fastened to the same vehicle wheel; and
said evaluation device being also connected to said first and second acceleration sensors of said additional sensor pair or said additional sensor pairs and being configured to generate the output measurement signal of all of said sensor pairs using the sensor signals.

* * * * *